US012026217B2

(12) United States Patent
Kawaguchi et al.

(10) Patent No.: US 12,026,217 B2
(45) Date of Patent: Jul. 2, 2024

(54) QUALITY EVALUATION APPARATUS, QUALITY EVALUATION METHOD AND PROGRAM

(71) Applicant: Nippon Telegraph and Telephone Corporation, Tokyo (JP)

(72) Inventors: Ginga Kawaguchi, Musashino (JP); Hideki Ogawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/801,105

(22) PCT Filed: Feb. 21, 2020

(86) PCT No.: PCT/JP2020/007228
§ 371 (c)(1),
(2) Date: Aug. 19, 2022

(87) PCT Pub. No.: WO2021/166252
PCT Pub. Date: Aug. 26, 2021

(65) Prior Publication Data
US 2023/0107604 A1     Apr. 6, 2023

(51) Int. Cl.
*G06F 16/957* (2019.01)
(52) U.S. Cl.
CPC .............. *G06F 16/9574* (2019.01)
(58) Field of Classification Search
CPC .... G06F 11/3466; G06F 16/955; G06F 16/95; G06F 16/957; G06F 16/9574
See application file for complete search history.

(56) References Cited

U.S. PATENT DOCUMENTS

| | | | | |
|---|---|---|---|---|
| 10,965,573 | B1* | 3/2021 | Mooneyham | G06F 11/3466 |
| 2005/0135267 | A1* | 6/2005 | Galbraith | G06F 11/3438 |
| | | | | 714/E11.197 |
| 2008/0184116 | A1* | 7/2008 | Error | G06F 16/4393 |
| | | | | 715/704 |
| 2011/0066982 | A1* | 3/2011 | Paulsami | G06F 3/0482 |
| | | | | 715/835 |

(Continued)

FOREIGN PATENT DOCUMENTS

| | | |
|---|---|---|
| JP | 2010273045 | 12/2010 |
| JP | 2016505969 | 2/2016 |

(Continued)

OTHER PUBLICATIONS

Sato et al., "Quality of Experience Assessment Methods for Web-browsing Tasks," Proceedings of the General Conference of the Society of Electronic Information and Communication, Mar. 10, 2015, 3 pages.

(Continued)

*Primary Examiner* — Wilson W Tsui
(74) *Attorney, Agent, or Firm* — Fish & Richardson P.C.

(57) ABSTRACT

A quality evaluation apparatus includes: a recording unit configured to record information indicating a state of a web browser in a storage unit at a plurality of timings; and a count unit configured to count the number of times reload operation is performed as an evaluation value of quality experienced by a user with reference to the storage unit, so that validity of the evaluation of experienced quality of web browsing is improved.

10 Claims, 5 Drawing Sheets

(56) References Cited

U.S. PATENT DOCUMENTS

| | | | |
|---|---|---|---|
| 2012/0036456 A1* | 2/2012 | Grunberger | G06F 16/955 |
| | | | 715/760 |
| 2012/0060083 A1* | 3/2012 | Yuan | G06F 16/957 |
| | | | 715/234 |
| 2012/0203592 A1 | 8/2012 | Ravindran | |
| 2014/0173415 A1* | 6/2014 | Kattil Cherian | H04L 41/069 |
| | | | 715/234 |
| 2014/0279793 A1* | 9/2014 | Wohlstadter | G06Q 30/0277 |
| | | | 706/46 |
| 2015/0082135 A1* | 3/2015 | Schlesinger | H04L 43/045 |
| | | | 715/202 |
| 2016/0019604 A1* | 1/2016 | Kobayashi | H04N 21/47 |
| | | | 705/14.73 |

FOREIGN PATENT DOCUMENTS

| | | |
|---|---|---|
| JP | 2016134881 | 7/2016 |
| JP | 6349466 | 6/2018 |

OTHER PUBLICATIONS

Morioka et al., "QoS Control on Wi-Fi/Cellular Link-aggregation Environment," IEICE Technical Report, Jan. 2015, 114(417):13-18, 13 pages (with machine translation).

* cited by examiner

| TIME | TAB ID | URL | DISPLAY LATENCY | TRIGGER TYPE | OPERATION RECORD | VISIBILITY FLAG |
|---|---|---|---|---|---|---|
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| .. | .. | .. | .. | .. | .. | .. |

Fig. 4

QUALITY EVALUATION APPARATUS, QUALITY EVALUATION METHOD AND PROGRAM

CROSS-REFERENCE TO RELATED APPLICATIONS

This application is a National Stage application under 35 U.S.C. § 371 of International Application No. PCT/JP2020/007228, having an International Filing Date of Feb. 21, 2020. The disclosure of the prior application is considered part of the disclosure of this application, and is incorporated by reference in its entirety into this application.

TECHNICAL FIELD

The present invention relates to a quality evaluation apparatus, a quality evaluation method, and a program.

BACKGROUND ART

Web page browsing is widely practiced, but because of its wide variety of usage, common and reliable quality determination is difficult.

There is an approach in the related art to control page display latency and set page display latency to an observation target, from a viewpoint that the quality and comfort at the time of user's web browser usage primarily depends on the latency of the page display. That is, an approach has been practiced in which, in order to evaluate the quality and comfort of a web browser usage of a user by an experiment, the user is asked to browse a page using a web browser, the display of the web page is made slow by restricting a network band, processing content, or the like, display latency is recorded, and the record is collated and evaluated with the result of the quality experienced by the user obtained by directly asking the user (NPL 1).

CITATION LIST

Non Patent Literature

NPL 1: Sato, et al., "Quality of Experience Assessment Methods for Web-browsing Tasks" Proceedings of the 2015 IEICE General Conference, Communication (2) B-11-35, 452, 2015 Feb. 24.

SUMMARY OF THE INVENTION

Technical Problem

However, in web browsing, it is natural to perform browsing as one experience in which a plurality of page transitions is performed as a series of operation, and therefore, it is considered not appropriate to inquire about the experience of quality for each page.

On the other hand, even if the user is asked for the quality of the web browsing after multiple pages of transitions, the user is difficult to determine the range and the manner of evaluation, and difficult to perform the evaluation.

Page display latency itself is difficult to be used as a common indicator because it depends heavily on the content of the web page.

The present invention has been made in view of the above point and it is an object of the present invention to improve the evaluation validity of experienced quality of web browsing.

Means for Solving the Problem

In order to solve the above problem, a quality evaluation apparatus includes: a recording unit configured to record information indicating a state of a web browser in a storage unit at a plurality of timings; and a count unit configured to count the number of times reload operation is performed as an evaluation value of quality experienced by a user with reference to the storage unit.

Effects of the Invention

The validity of the evaluation of experienced quality of web browsing can be improved.

BRIEF DESCRIPTION OF DRAWINGS

FIG. 4 is a diagram illustrating a configuration example of a state history storage unit 15.

DESCRIPTION OF EMBODIMENTS

Hereinafter, embodiments of the present disclosure will be described with reference to the drawings.

A web browser user may perform an "operation method/measure according to a situation where display of a web page is slow" such as performing reloading processing when the quality of a network is deteriorated and web page display becomes slow, returning to access again, and using a plurality of tabs.

Therefore, if these operating conditions can be observed and recorded, it is possible to grasp and analyze the experienced quality (quality of experience (QoE)) of the user. However, even for experimental purposes, it is difficult to record these pieces of information by visually monitoring from the outside or the like.

Thus, in the present embodiment, the operating state of the web browser is monitored via an application program interface (API) of a web browser, the operation by the user is recorded, the presence or absence of an "operation method or measure according to a situation where display of a web page is slow" is analyzed on the basis of the record, and a value (evaluation value) indicative of experienced quality of the user is measured.

As an "operation method and measure according to a situation where display of a web page is slow", the present embodiment is directed to reloading operation, return operation, and display tab switching operation.

Figure 1:
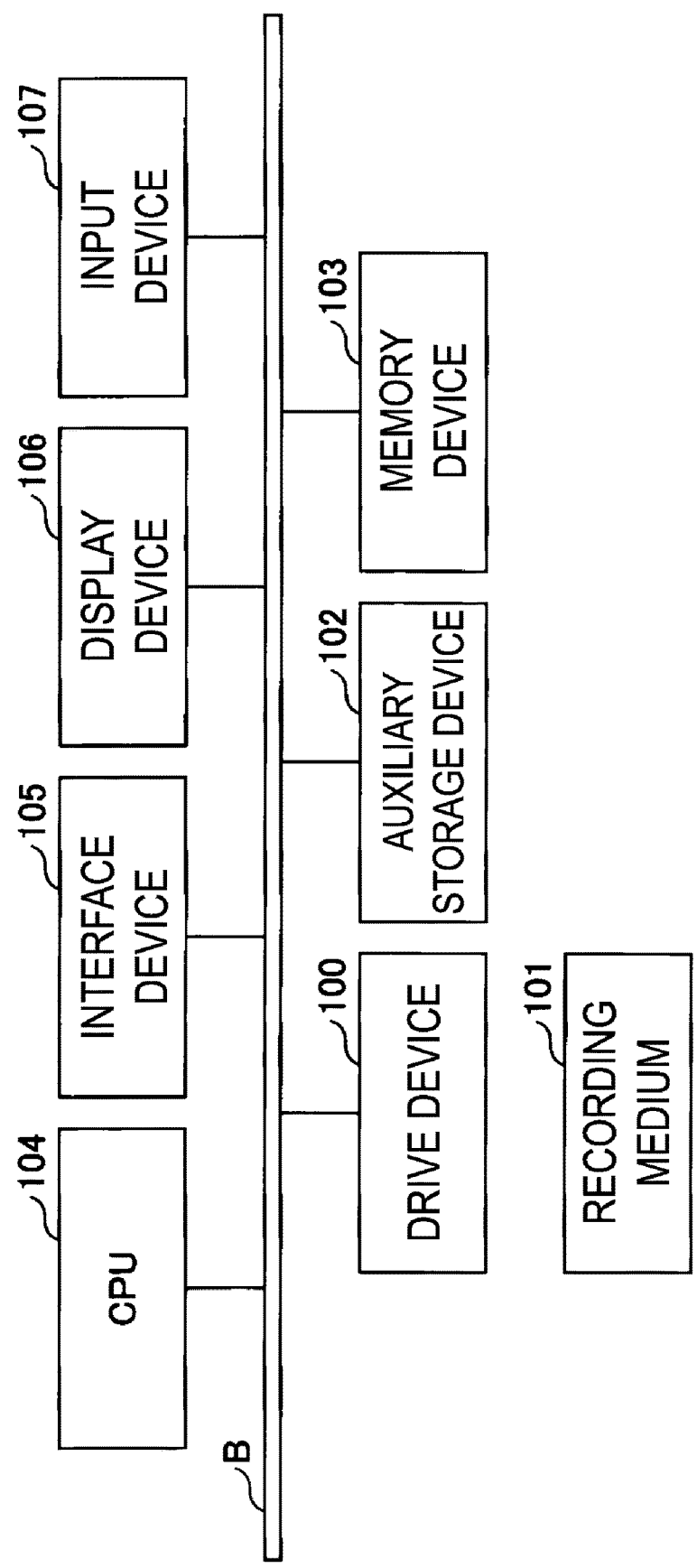
FIG. 1 is a diagram illustrating a hardware configuration example of a quality evaluation apparatus 10 according to an embodiment of the present invention.

A quality evaluation apparatus 10 that achieves the above will be specifically described. FIG. 1 is a diagram illustrating a hardware configuration example of the quality evaluation apparatus 10 according to an embodiment of the present invention. The quality evaluation apparatus 10 of FIG. 1 includes a drive device 100, an auxiliary storage device 102, a memory device 103, a CPU 104, an interface device 105, a display device 106, an input device 107, and the like, which are connected to each other through a bus B.

A program that realizes processing in the quality evaluation apparatus 10 is provided on a recording medium 101 such as a CD-ROM. When the recording medium 101 storing the program is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores the installed program and also stores necessary files, data, and the like.

The memory device 103 reads and stores the program from the auxiliary storage device 102 when the program is instructed to start. The CPU 104 realizes a function relevant to the quality evaluation apparatus 10 in accordance with the program stored in the memory device 103. The interface device 105 is used as an interface for connection to a network. The display device 106 displays a graphical user interface (GUI) according to a program or the like. The input device 107 is constituted by a keyboard, a mouse, or the like, or a touch panel, and is used to input various operation instructions. Examples of the quality evaluation apparatus 10 include a smart phone, a tablet terminal, and a personal computer (PC).

Figure 2:
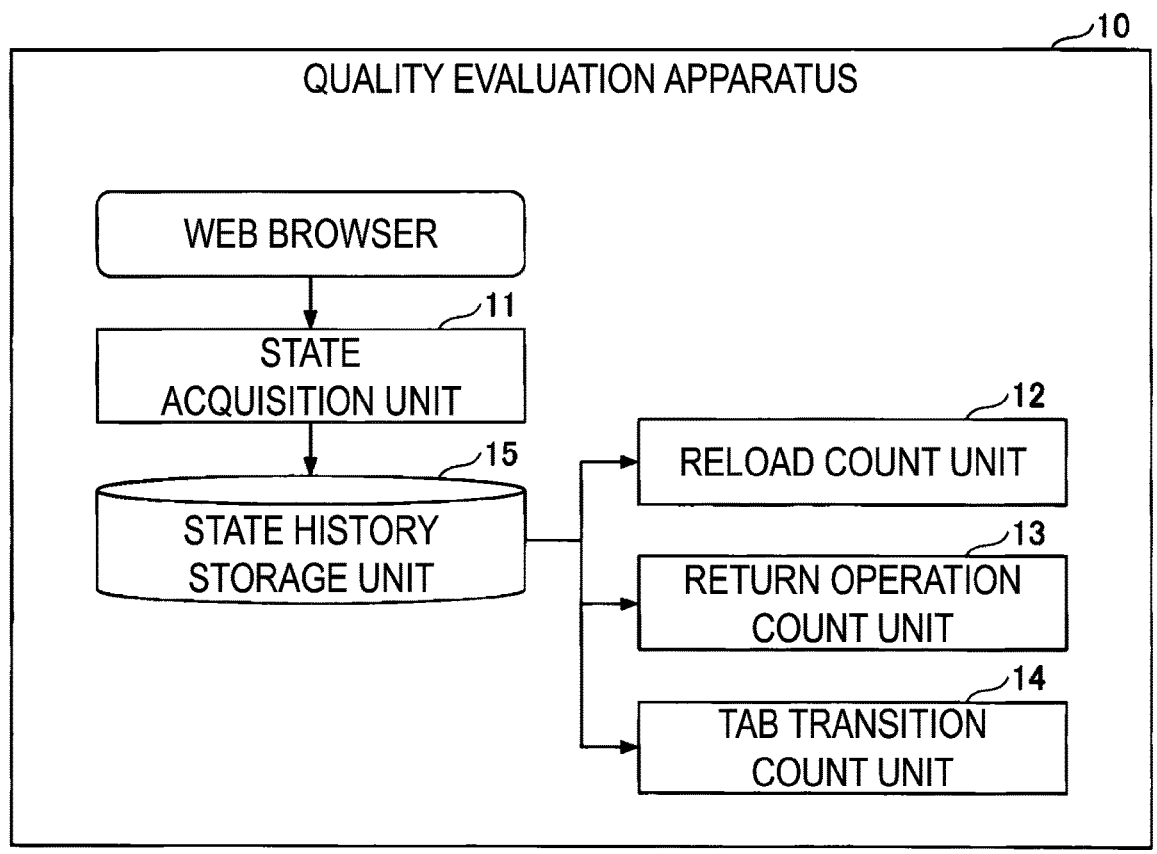
FIG. 2 is a diagram illustrating a functional configuration example of the quality evaluation apparatus 10 according to the embodiment of the present invention.

FIG. 2 is a diagram illustrating a functional configuration example of the quality evaluation apparatus 10 according to the embodiment of the present invention. In FIG. 2, the quality evaluation apparatus 10 includes a state acquisition unit 11, a reload count unit 12, a return operation count unit 13, and a tab transition count unit 14. One or more programs installed in the quality evaluation apparatus 10 cause the CPU 104 to execute processing, thereby these units are achieved. The quality evaluation apparatus 10 also uses a state history storage unit 15. The state history storage unit 15 can be achieved by using, for example, a storage device that can be connected to the auxiliary storage device 102 or the quality evaluation apparatus 10 via the network.

The state acquisition unit 11 acquires data (hereinafter, referred to as "state data") including information regarding a state of the web browser at the time, for example, at a plurality of timings at which a predetermined trigger (event) occurs. Strictly, state data is acquired in tab units. Thus, if a plurality of tabs are open in a web browser, the acquisition of state data is performed in parallel. The state acquisition unit 11 records the acquired state data in the state history storage unit 15. The state acquisition unit 11 may be implemented, for example, by a script such as the Java script (trade name). In this case, setting the script to be performed when displaying the web page for the web browser allows the script to cause the CPU 104 to function as the state acquisition unit 11.

In the present embodiment, the predetermined trigger (hereinafter, referred to as "target trigger") is four as below.

(1) When reading new web page (when a location is provided for displaying a new page in a web browser by a page transition or the like)
(2) Occurrence of a page transition
(3) When a display state changes (when the web browser becomes the application to be operated or when tab switching in the web browser causes the tab to be displayed or when the tab is hidden)
(4) Every fixed interval For (1), detection can be made as injection processing of a start event that occurs when a new page is read. That is, when a new page reading occurs, the web browser invokes the state acquisition unit 11, so that the state acquisition unit 11 can detect the reading. For (2), the start event can be detected by registering in advance click or dblclick (double click) events in addEventListener( ) capturing these events, and capturing navigete events based on the event.

For (3), the start event can be detected by registering in advance visibilityChange events in addEventListener( ) and capturing these events.

For (4), the start event can be detected by setting in advance a timer.

The reload count unit 12 counts the number of reload operations as an example of the value (evaluation value) of the experienced quality of the user on the basis of the history of the time series of state data recorded in the state history storage unit 15, and outputs the count result as an evaluation value. A reload operation refers to the operation of reloading the same web page.

The return operation count unit 13 counts the number of return operations as an example of the evaluation value of the experienced quality of the user on the basis of the history of the time series of state data recorded in the state history storage unit 15, and outputs the count result as an evaluation value.

The tab transition count unit 14 counts the number of tab transitions (tab switching operations) as an example of the evaluation value of the experienced quality of the user on the basis of the history of the time series of state data recorded in the state history storage unit 15, and outputs the count result as an evaluation value.

Figure 3:
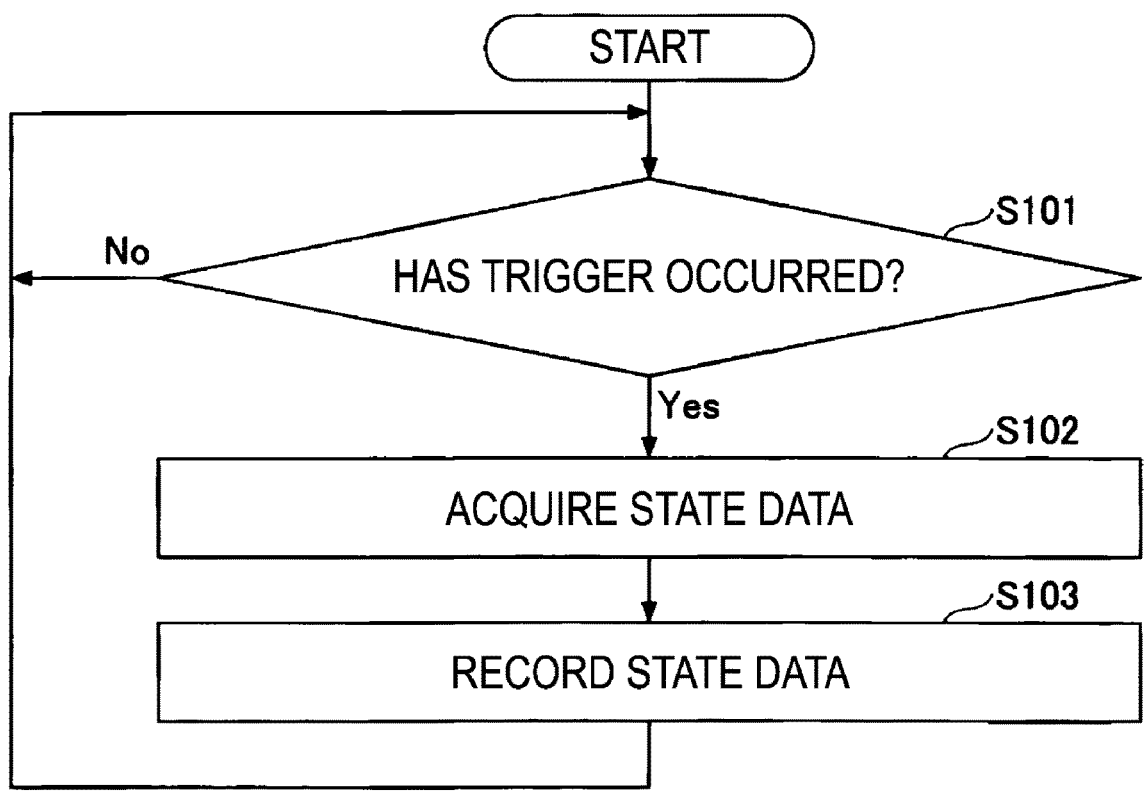
FIG. 3 is a flowchart illustrating an example of a processing procedure of recording processing for state data.

Hereinafter, a processing procedure that is performed by the quality evaluation apparatus 10 will be described. FIG. 3 is a flowchart illustrating an example of a processing procedure of recording processing for state data. The state data refers to data indicating a state of a web browser. The processing procedure in FIG. 3 is performed in parallel for each tab.

The state acquisition unit 11 waits for the occurrence of a target trigger (S101). Upon detecting the occurrence of the target trigger in any of (1) to (4) described above (Yes in S101), the state acquisition unit 11 acquires the state data from the web browser (S102). Next, the state acquisition unit 11 records the state data in the state history storage unit 15 (S103), and waits for the occurrence of the target trigger (S101).

FIG. 4 is a diagram illustrating a configuration example of the state history storage unit 15. As is clear from the processing procedure in FIG. 3, the state history storage unit 15 stores state data in chronological order at the timing when any of the target events occurs.

Each state data includes "time" and page information such as "tab ID", "URL", "display latency", "trigger type", "operation record", and "visibility flag". That is, the "tab ID" is the information for each web page.

The "time" is the time at which the state data is acquired (the time of occurrence of any of the target triggers). The "tab ID" is the ID of the tab from which the state data is acquired, and can be acquired by querying the value of the "tab ID" using the API of the web browser.

The "URL" is the URL of the web page to be displayed and can be acquired by querying the value of "location.href" using the web browser API.

The "display latency" is the display latency of a web page to be displayed in the tab, and can be calculated from parameters obtained using an API of navigationTiming, for example. The "trigger type" is a type of target trigger that triggers the acquisition of the state data. In the present embodiment, (1) to (4) described above are target triggers, and the trigger type for each of the target triggers (1) to (4) is recorded in the state data in the following character string.

(1) "start"
(2) "navigate"
(3) "visibilityChange"
(4) "timer"

The "operation record" is a type of operation by a user and can be acquired by querying the value of the type using the API, navigationTiming.

A "visibility flag" is information indicating whether a tab is visible and can be acquired by querying the value of "document.hidden" using the API of the web browser.

In general, a plurality of frames are included in one web page, and a parameter of page information can be acquired for each frame. However, it is sufficient that page information of the highest frame (a frame whose window.top attribute is true) is acquired.

Depending on the timing, a value of some of the parameters constituting the page information cannot be acquired. For example, the possibility that the display latency can be acquired at the timing of (1) to (3) is low, and at the timing of (4), the possibility that the display latency of the currently displayed web page can be acquired is high. On the other hand, there is a possibility that the URL cannot be acquired at the timing of (1). Thus, state data in which the URL is empty (hereinafter, referred to as "URL empty data") may be recorded in the state history storage unit 15. It is sufficient that the value of the URL of the state data acquired at the timing of (4) is recorded in the "URL" of the URL empty data that is preceding the state data and has common state data and tab ID.

Figure 5:
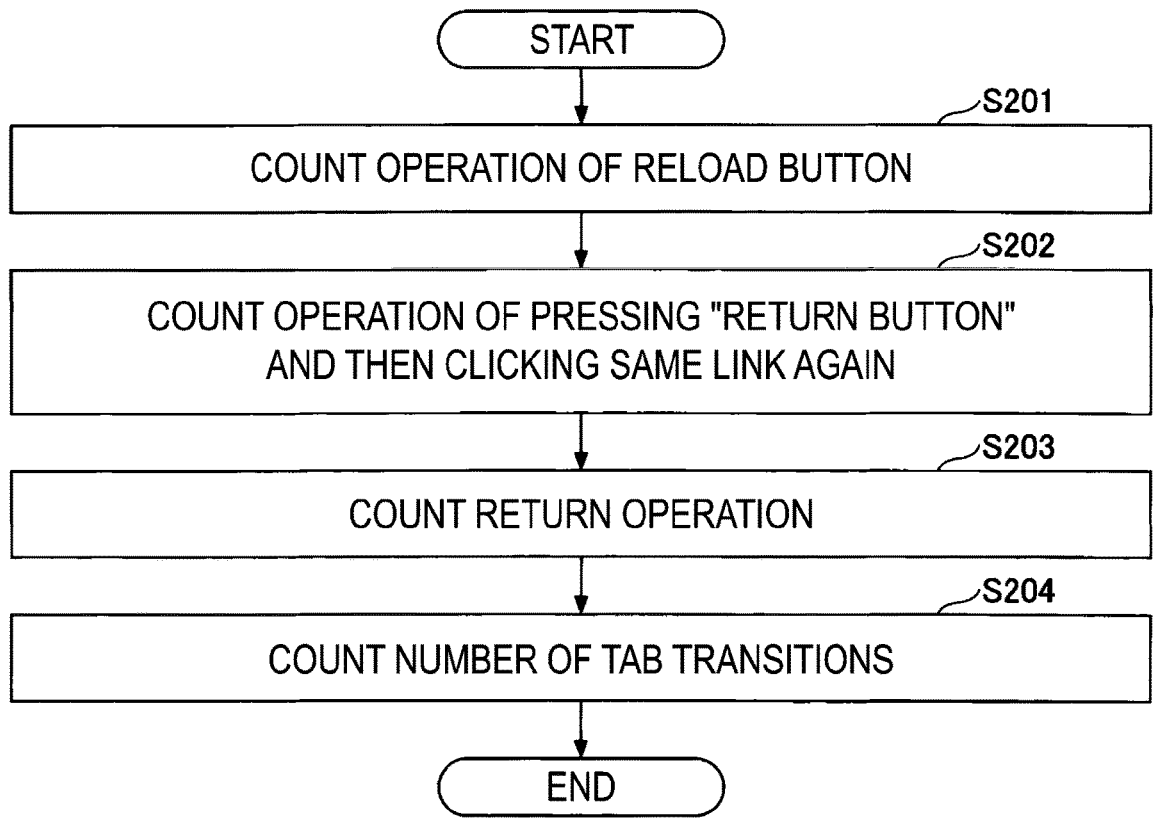
FIG. 5 is a flowchart illustrating an example of a processing procedure of measurement processing of a quality evaluation value based on the history of state data.

Next, the processing of measuring the quality evaluation value using the history of the state data will be described. FIG. 5 is a flowchart illustrating an example of a processing procedure of measurement processing of a quality evaluation value based on the history of state data.

In steps S201 and S202, the reload count unit 12 counts the number of reload operations with reference to the history of state data (FIG. 4).

In step S201, the number of operations (presses) of the "reload button" (that is, direct operation of reloading) in the history of state data (FIG. 4) is counted. Such operation can be identified by counting the number of pieces of state data in which the "trigger type" is "page transition" and the "operation record" is "reload" in the history of state data.

On the other hand, in step S202, the number of operations of "pressing the back button and clicking the same link again" is counted. This is because such operation is considered to correspond to reload operation from the sense of operation of the user. The operation can be identified by counting the number of times of "a case where a return button is operated (pressed) from a certain web page (while a certain web page is displayed), and the same URL as that of the web page is accessed in page transition immediately after (within threshold X seconds) the operation (pressing). Specifically, state data (hereinafter, referred to as "back_forward state data") in which the "operation record" is "back_forward" is identified. Then, there is state data including the URL as below, among pieces of state data whose tab ID is the same as that of the back_forward state data, within a fixed interval (for example, threshold X seconds) after the time of the back_forward state data, it is counted as one operation of "pressing the back button and clicking the same link again". Here, the URL is the same URL as the URL of the state data immediately before the back_forward state data.

The reload count unit 12 outputs the total of the number of times counted in steps S201 and S202 as the number of reload operations.

Subsequently, the return operation count unit 13 counts the number of return operations with reference to the history of state data (S203). Specifically, the return operation count unit 13 counts the number of pieces of state data that the "operation record" is "back_forward" and outputs the number as the number of return operations.

Subsequently, the tab transition count unit 14 counts the number of tab transitions with reference to the history of state data (S204). Specifically, the tab transition count unit 14 first identifies each piece of state data in which the "visibility flag" is "True". Subsequently, the tab transition count unit 14 determines whether the "tab ID" of the state data and the "tab ID" of the state data immediately before the state data are different for each piece of identified state data. The tab transition count unit 14 outputs the number of determination results indicating that the compared tab IDs are different as the number of tab transitions.

The numerical value indicating the number of times counted in the above is considered to have a characteristic that increases with a reduction in the experienced quality and comfort of the user. Accordingly, the numerical value itself, or a numerical value normalized to the value per number of viewed web pages may be the value of the experienced quality of the user. The number of viewed web pages can be measured, for example, by the number of pieces of state data that the trigger type is "start" or the number of types of "URL" among the group of state data that is subject to the processing of FIG. 5.

As described above, according to the present embodiment, the validity of the evaluation of experienced quality of web browsing can be improved.

Note that, in the present embodiment, the state acquisition unit 11 is an example of a recording unit. The reload count unit 12, the return operation count unit 13, the tab transition count unit 14 are examples of a count unit. The state history storage unit is an example of a storage unit.

Although the embodiments of the present disclosure have been described in detail above, the present disclosure is not limited to such specific embodiments, and various modifications and change can be made within the scope of the gist of the present disclosure described in the aspects.

REFERENCE SIGNS LIST

10 Quality evaluation apparatus
11 State acquisition unit
12 Reload count unit
13 Return operation count unit
14 Tab transition count unit
15 State history storage unit
100 Drive device
101 Recording medium
102 Auxiliary storage device
103 Memory device
104 CPU
105 Interface device
106 Display device
107 Input device
B Bus

The invention claimed is:

1. A quality evaluation apparatus comprising a processor and a storage device storing instructions that when executed by the processor cause the processor to perform operations comprising:

using an application program interface (API) to monitor an operation state of a web browser;
repeatedly performing, in response to detecting a trigger event, recording state data of the web browser;
measuring, based on recorded state data, one or more values comprising (i) a number of tab transition operations that have been performed and (ii) a number of reload operations that have been performed, wherein the number of reload operations is measured based on a sum of (a) a number of times a reload button of the web browser is pressed and (b) a number of times a transition to a first web page is performed after a return operation is performed while the first web page is displayed; and
determining an experience quality metric of the web browser based at least on the number of tab transition operations normalized by a number of web pages that have been viewed.

2. The quality evaluation apparatus according to claim 1, wherein:
the one or more values further comprise a number of return operations that have been performed.

3. The quality evaluation apparatus according to claim 1, wherein the trigger event comprises one or more of: (i) a new web page is being displayed, (ii) a page transition occurs, (iii) a display state changes, or (iv) a fixed time interval is reached.

4. The quality evaluation apparatus according to claim 1, wherein the state data of the web browser specifies information comprising: (i) a time at which the state data is recorded, (ii) a trigger type, and (iii) an operation record.

5. The quality evaluation apparatus according to claim 4, wherein the information specified by the state data further comprise: (iv) a tab ID, (v) an URL, (vi) a display latency, and (vii) a visibility flag.

6. The quality evaluation apparatus according to claim 1, wherein:
the web browser displays a web page that includes a plurality of frames; and
at least a portion of the state data is obtained from page information of a top frame of the web page, wherein the top frame is a frame for which a "window.top" attribute is true.

7. A computer-implemented quality evaluation method comprising:
using an application program interface (API) to monitor an operation state of a web browser;
repeatedly performing, in response to detecting a trigger event, recording state data of the web browser;
measuring, based on recorded state data, one or more values comprising (i) a number of tab transition operations that have been performed and (ii) a number of reload operations that have been performed, wherein the number of reload operations is measured based on a sum of (a) a number of times a reload button of the web browser is pressed and (b) a number of times a transition to a first web page is performed after a return operation is performed while the first web page is displayed; and
determining an experience quality metric of the web browser based on the number of tab transition operations normalized by a number of web pages that have been viewed.

8. The quality evaluation method according to claim 7, wherein:
the one or more values further comprise a number of return operations that have been performed.

9. A non-transitory computer-readable medium storing a program causing a computer to perform operations comprising:
using an application program interface (API) to monitor an operation state of a web browser;
repeatedly performing, in response to detecting a trigger event, recording state data of the web browser;
measuring, based on recorded state data, one or more values comprising (i) a number of tab transition operations that have been performed and (ii) a number of reload operations that have been performed, wherein the number of reload operations is measured based on a sum of (a) a number of times a reload button of the web browser is pressed and (b) a number of times a transition to a first web page is performed after a return operation is performed while the first web page is displayed; and
determining an experience quality metric of the web browser based on the number of tab transition operations normalized by a number of web pages that have been viewed.

10. The non-transitory computer-readable medium according to claim 9, wherein the one or more values further comprises:
the one or more values further comprise a number of return operations that have been performed.

* * * * *